US009100284B2

United States Patent
Kovacsiss, III

(10) Patent No.: US 9,100,284 B2
(45) Date of Patent: Aug. 4, 2015

(54) SYSTEM AND METHOD FOR INSTALLATION OF NETWORK INTERFACE MODULES

(75) Inventor: Stephen A. Kovacsiss, III, Rochester, NY (US)

(73) Assignees: Bosch Security Systems, Inc., Fairport, NY (US); Robert Bosch GmbH, Stuttgart (DE)

(*) Notice: Subject to any disclaimer, the term of this patent is extended or adjusted under 35 U.S.C. 154(b) by 894 days.

(21) Appl. No.: 11/288,806

(22) Filed: Nov. 29, 2005

(65) Prior Publication Data

US 2007/0124468 A1 May 31, 2007

(51) Int. Cl.
*G06F 15/16* (2006.01)
*H04L 12/24* (2006.01)
*H04L 29/06* (2006.01)
*H04L 29/08* (2006.01)

(52) U.S. Cl.
CPC ........ *H04L 41/0253* (2013.01); *H04L 41/0806* (2013.01); *H04L 41/0883* (2013.01); *H04L 63/20* (2013.01); *H04L 67/025* (2013.01); *H04L 67/34* (2013.01); *H04L 41/22* (2013.01)

(58) Field of Classification Search
USPC ........................... 709/250, 229; 719/320, 328
See application file for complete search history.

(56) References Cited

U.S. PATENT DOCUMENTS

| | | | |
|---|---|---|---|
| 6,212,585 B1 * | 4/2001 | Chrabaszcz | 710/302 |
| 6,308,205 B1 | 10/2001 | Carcerano et al. | |
| 6,584,499 B1 | 6/2003 | Jantz et al. | |
| 7,472,179 B2 * | 12/2008 | Tarui et al. | 709/223 |
| 2001/0034759 A1 | 10/2001 | Chiles et al. | |
| 2001/0036192 A1 | 11/2001 | Chiles et al. | |
| 2002/0198969 A1 | 12/2002 | Engel et al. | |
| 2003/0108018 A1 | 6/2003 | Dujardin et al. | |
| 2003/0233429 A1 * | 12/2003 | Matte et al. | 709/221 |
| 2004/0027887 A1 * | 2/2004 | Dean | 365/201 |
| 2004/0098472 A1 | 5/2004 | Styles et al. | |
| 2004/0119894 A1 * | 6/2004 | Higgins et al. | 348/734 |
| 2005/0005005 A1 | 1/2005 | Styles et al. | |
| 2005/0010649 A1 | 1/2005 | Payne et al. | |
| 2005/0044359 A1 | 2/2005 | Eriksson et al. | |

FOREIGN PATENT DOCUMENTS

| | | | | | |
|---|---|---|---|---|---|
| EP | 0917052 A1 | * | 5/1999 | | G06F 9/44 |
| WO | WO9838570 | * | 9/1998 | | G06F 9/24 |

* cited by examiner

*Primary Examiner* — Afshawn Towfighi
(74) *Attorney, Agent, or Firm* — Faegre Baker Daniels LLP

(57) ABSTRACT

The present invention is directed to a method and system for installing and programming a network interface module within a security system. A security programming system may be implemented from a computing device connected over a network with the network interface module. The computing device may communicate with a server storing components of the security programming system. The security programming system may include user interface components located on the server and accessible through a browser of the computing device to enable selection of a network interface module participating in the security system and selection of a security system application program. The system may additionally include one or more programming applications located on the server for programming the selected network interface module to operate within the security system, wherein the programming application is selectable from the user browser of the computing device.

27 Claims, 17 Drawing Sheets

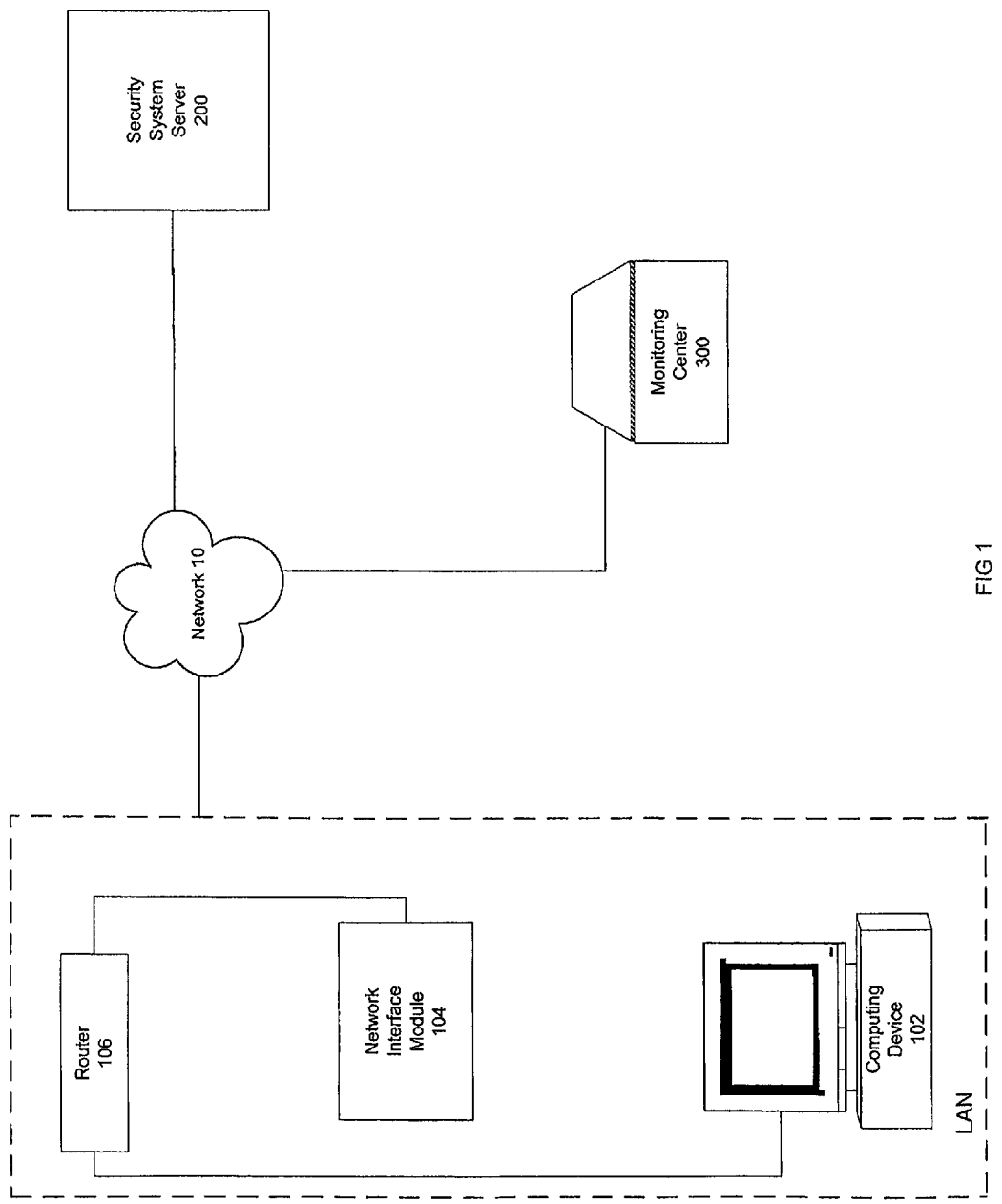

470

Enter the Application ID that was given to you by the Monitoring Center.

If you do not have the Application ID, contact your monitoring center.

Enter Application ID below.

480 Application ID 0009 does not exist. Verify that the ID was entered correctly.

If the ID was entered correctly, contact the monitoring center to verify the Application ID.

Enter Application ID below:

510 — Application ID 0001 was chosen.

If this is incorrect, click Configure your C900V2 to start over.

520 — Below is a list of network modules found on your network. Please select MAC Address of the module that has the same MAC Address as the module that you are programming and click the Program button. If you require a Static IP Address or a Telnet password in the module, such as in a UL Installation, click the Advanced button.

Located Devices
530 — ◉ 00:20:4A:22:36:C4
○ 00:20:4A:82:5B:41

[ Program ] [ Advanced ] [ Scan again ]
540            550            560

FIG 5A

570   Congratulations, you have successfully programmed your C900V2

Application ID 0001 was chosen.

\*\* If this is incorrect, click Configure your C900V2 to start over. \*\*
610
Advanced Parameters
If you would like to program a static IP Address for the module, then enter the required information below. If you want to keep it setup for DHCP, then keep the DHCP checkbox selected.

630     ☑ DHCP
640  IP Address:  [192] . [168] . [100] . [200]
650  Subnet Mask: [255] . [255] . [255] . [0]
660  Gateway:  [192] . [168] . [100] . [1]

670   If you require a Telnet password to the module, such as in a UL installation, select the Yes button and supply a four character password below.

◉ No   ○ Yes  [xxxx]

690  [Program] [Cancel]

Built-In Web Manager Programming
680  If you would like to connect to the module with the full built-in web manager, [click here]

FIG 6

Related Art

Related Art

Related Art

Related Art

Related Art

SYSTEM AND METHOD FOR INSTALLATION OF NETWORK INTERFACE MODULES

TECHNICAL FIELD

Embodiments of the present invention relate to security systems. More particularly, embodiments of the invention are directed to installation and programming of network interface modules for interaction with security systems.

BACKGROUND OF THE INVENTION

Currently, in the field of security systems, network interface modules require installation and programming in order to function within the security systems. The field of security systems may include, but should not be limited to intrusion detection systems, fire alarm systems, and access restriction systems. Installation and programming of network interface modules within these systems require individuals to have knowledge of network terminology, network tools, and network functions. Accordingly, only trained individuals are capable of installing and programming network interface modules within security systems.

Specifically, FIGS. 9-17 illustrate a currently available installation and programming technique. The screen displays shown in these FIGs illustrate the fact that no icon-based user-friendly operating system is available for the installation and programming of network interface modules. FIG. 9 illustrates an initial screen 900 that requires entry of a Media Access Control (MAC) address and an Internet Protocol (IP) address. The MAC address is a hardware address that identifies nodes within a network. Accordingly in order to proceed, individuals must be aware of these addresses.

FIG. 10 illustrates a display 1000 including an Address Resolution Protocol (ARP) table that is subsequently produced. The ARP is used to convert an IP address into a physical address. The installer is required to verify that the entered information appears in the ARP table. Subsequently, as shown in FIG. 11, a display 1100 requires the installer to open a Telnet prompt and attempt to connect to the IP address. The Telnet program connects a computing device to a server on the network such that commands will be executed as if they had been entered directly onto a server console.

FIG. 12 includes a screen display 1200 that shows a failure to connect. An attempt to connect to the IP address on an alternate port 9999 is shown by screen 1300 in FIG. 13. If the connection is successful, the installer may be prompted to enter setup mode as shown by screen 1400 in FIG. 14.

FIGS. 15 and 16 provide screens 1500 and 1600 respectively that require the installer to select entries from the menu and enter related parameters. In FIG. 15, the installer selects "0" and in FIG. 16, the installer enters the parameter "1". FIG. 17 illustrates a screen display 1700 showing that the installer has selected "6" from the menu because the installer is using encryption. The installer is also required to enter the parameters as shown.

Accordingly, the current model requires knowledge of network terminology, network tools and network functions. These include IP addressing, subnets, MAC addresses, ARP, and TELNET. This requirement makes it difficult for individuals who have not been trained on the network to install or program a network device. Thus, a solution is needed that facilitates installation and programming of network interface modules and provides user-friendly interfaces that can be utilized without extensive network training.

BRIEF SUMMARY OF THE INVENTION

In one aspect, a security programming system is provided for programming a network interface module to interact with a security system. The programming may occur from a computing device connected over a network with the network interface module, the computing device communicating with a server storing components of the security programming system. The security programming system may include user interface components located on the server and accessible through a browser of the computing device to enable selection of a network interface module and a security system application program. The security programming system may additionally include a programming application located on the server for programming the selected network interface module with the selected program to operate within the security system, wherein the programming application is activated by a user selectable or fill-in option from the browser of the computing device.

In an additional aspect, a method may be provided for facilitating programming of a network interface module of a security system from a browser of a computing device connected with the network interface module. The computing device is capable of communicating over a network with a server storing components of a security programming system. The method may include providing a programming resource through the server upon receiving a request from the computing device, and delivering a user interface including selectable parameters, viewable through the browser, for locating the network interface module and selecting an application. The method may additionally include offering a selectable programming option through the user interface for initiating programming of the network interface module from the computing device.

In an additional aspect, a method may be provided for programming a network interface module of a security system from a browser of a computing device connected with the network interface module, the computing device capable of communicating with a server storing components of a security programming system. The method may include accessing a programming resource residing on the server through the browser of the computing device. The method may additionally include locating the network interface module of the security system through user interface components provided by the programming resource and selecting a programming option provided through the user interface components to program the located network interface module using the programming resource.

BRIEF DESCRIPTION OF THE DRAWINGS

The present invention is described in detail below with reference to the attached drawings figures, wherein:

FIG. 1 is a block diagram illustrating components of a security system environment in accordance with an embodiment of the invention;

FIGS. 4A, 4B, and 4C are screen displays illustrating a user interface in accordance with embodiments of the invention;

FIGS. 5A and 5B are screen displays illustrating additional user interfaces in accordance with an embodiment of the invention;

FIG. 6 is a screen display illustrating a user interface for advanced configuration tools in accordance with an embodiment of the invention;

DETAILED DESCRIPTION OF PREFERRED EMBODIMENTS

Figure 2A:
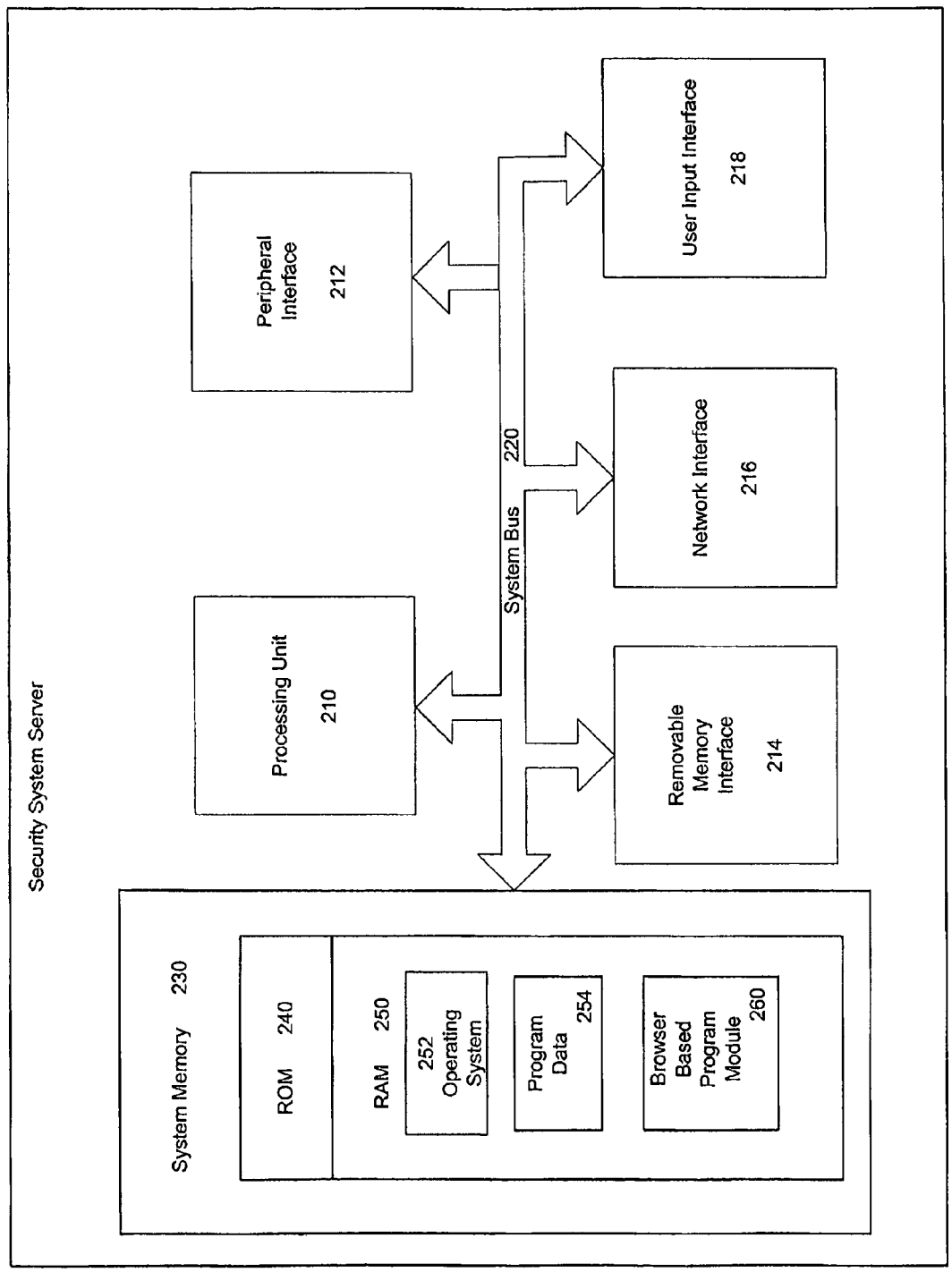
FIG. 2A is a block diagram illustrating components of a security system server in accordance with an embodiment of the invention.

Embodiments of the present invention are directed to a system and method for installing and programming one or more network interface modules for operation in a security system. The security system may include any of a number of types of systems including intrusion, fire, access, or other systems used in the security industry.

FIG. 1 is a block diagram illustrating components of a security system network environment in accordance with an embodiment of the invention. In the illustrated system, a computing device 102, a network interface module 104, and a router, switch or hub 106 are connected within a Local Area Network (LAN) 100. The components of the LAN 100 may be connected over a network 10 with a monitoring center 300 and a security system server 200. This server 200 need not be dedicated entirely to the security system and is merely identified as the security system server 200 for convenience.

The central monitoring center 300 resides on any network accessible by the network interface module 104 after the network interface module 104 is installed in the installation location. Although FIG. 1 shows only one network interface module 104, more than one network interface module 104 may be present within the LAN 100 and connected to the router, switch or hub 106. The network interface module 104 will typically be an embedded module.

FIG. 2A is a block diagram illustrating components of a security system server 200 in accordance with an embodiment of the invention. The security system server 200 may include a processing unit 210, a peripheral interface 212, a removable memory interface 214, a network interface 216, and a user input interface 218. The security system server 200 may also include a memory 230. A system bus 220 may be used to couple the aforementioned components.

The system memory 230 may include computer storage media in the form of volatile and/or nonvolatile memory such as read only memory (ROM) 240 and random access memory (RAM) 250. A basic input/output system (BIOS), containing the basic routines that help to transfer information between elements within the security system server 200, such as during start-up, is typically stored in ROM 240. RAM 250 typically contains data and/or program modules that are immediately accessible to and/or presently being operated on by processing unit 210.

The RAM 250 may include an operating system 252, program data 254 and a browser based program module 260. The browser based program module 260 and any other application programs stored in RAM 250 may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

The security system server 200 may also include other removable/non-removable, volatile/nonvolatile computer storage media. A hard disk drive may be provided that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 220 through a non-removable memory interface. The magnetic disk drive and optical disk drive are typically connected to the system bus by a removable memory interface.

A user may enter commands and information through the user input interface 218 using input devices such as a keyboard and pointing device, commonly referred to as a mouse, trackball or touch pad. Other input devices may include a microphone, satellite dish, scanner, or the like. These and other input devices are often connected to the processing unit 210 through the user input interface 218 that is coupled to the system bus 220, but may be connected by other interface and bus structures, such as a parallel port or a universal serial bus (USB). A monitor or other type of display device and other peripherals may also be connected to the system bus 220 via an interface, such as the peripheral interface 212. However, in this disclosed embodiment, since the server 200 is a web server, it will generally be accessed remotely by an administrator sending files and configurations with an FTP connection.

The illustrated security system server 200 is merely an example of a suitable environment for the system of the invention and is not intended to suggest any limitation as to the scope of use or functionality of the invention. Neither should the security system server 200 be interpreted as having any dependency or requirement relating to any one or combination of components illustrated.

The security system server 200 in the present invention may operate in a networked environment using logical connections to communicate with networked components. Logical connections for networking may include a local area network (LAN) or a wide area network (WAN), but may also include other networks. When used in a LAN networking environment, the system may be connected to the LAN through the network interface 216 or adapter. When used in a WAN networking environment, the security system server 200 typically includes a modem, a network interface, or other means for establishing communications to a WAN, such as the Internet. The modem, which may be internal or external, may be connected to the system bus 220 via the user input interface 218 or other appropriate mechanism.

Figure 2B:
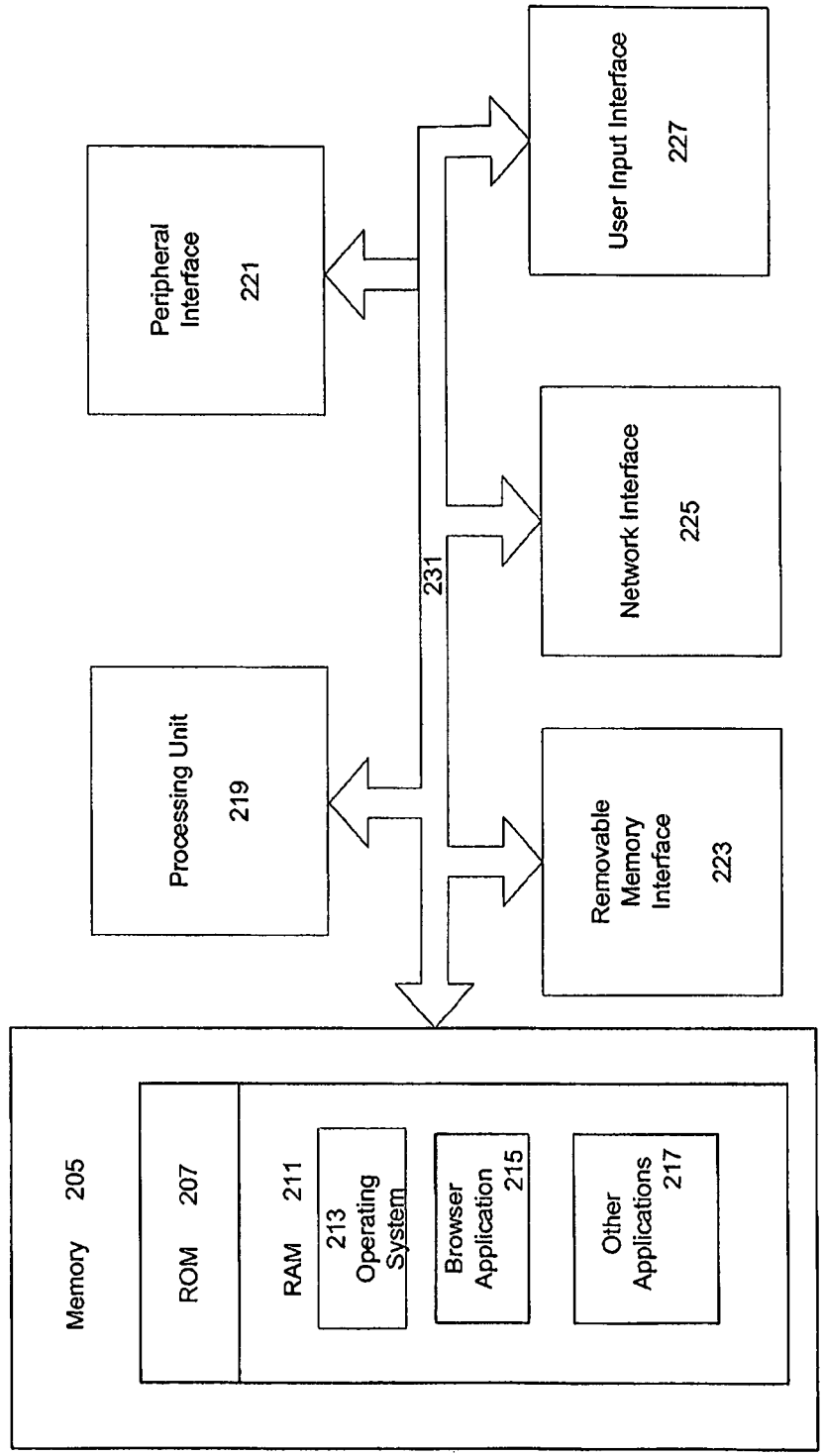
FIG. 2B is a block diagram illustrating components of a computing device in accordance with an embodiment of the invention.

Although only the security system server 200 has been described in detail with respect to the appropriate computerized environment, it should be understood that the other components shown in FIG. 1, such as the computing device 102 operate in a similar computerized environment. FIG. 2B illustrates an exemplary computing device 102 in accordance with an embodiment of the invention. Similarly to the server 200, the computing device 102 may include processing unit 219, peripheral interface 221, removable memory interface 223, network interface 225, and user input interface 227 connected over a bus 231. A memory 205 may also be connected with the bus 231 and may include a ROM 207 and RAM 211 such as those described above with respect to FIG. 2A. In the computing device 102, the RAM 211 may store an operating system 213, a browser application or web browser 215, and other applications 217. The web browser 215 enables the programmer or installer to communicate with the security system server 200. The web browser 215 is capable of running JAVA or another suitable scripting language such that it may implement the browser-based program module 260 on the security system server 200.

Figure 3:
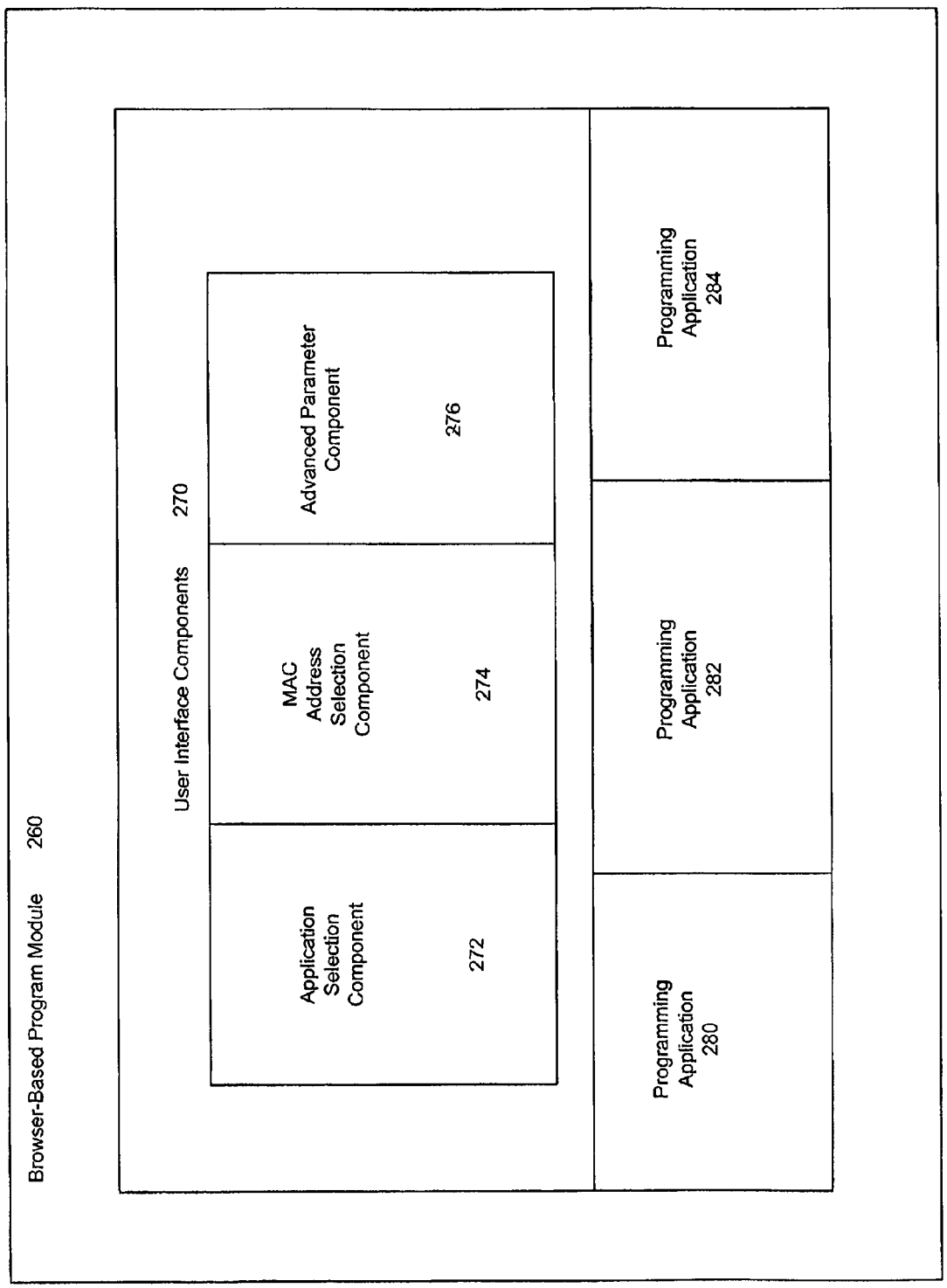
FIG. 3 is a block diagram illustrating a browser based program module incorporated in the security system server in accordance with an embodiment of the invention.

FIG. 3 is a block diagram illustrating a browser based program module 260 incorporated in the security system server 200 in accordance with an embodiment of the invention. The browser-based program module 260 may include user interface components 270. The user interface components 270, accessible through the browser application 215 of the computing device 102, may include an application selection component 272, a MAC address selection component 274, and an advanced parameter component 276. The browser based program module 260 may additionally include multiple programming applications 280, 282, 284. Each of these program applications may be associated with a unique identifier. The provision of three programming applications is merely exemplary. Any number of programming applications may be included. Each of these components will be further described below in conjunction with FIGS. 4-6.

Figure 4A:

FIG. 4A shows a screen display 400 illustrating a user interface in accordance with an embodiment of the invention. The screen display 400 will appear when a user wants to program or install a network interface module 104, opens the web browser 215 on the computing device 102, and enters an appropriate address, such as a DNS name or an IP address, of the system server 200 in the address bar of the web browser 215. The system server 200 will then cause a user interface such as screen display 400 to appear in the user browser 215. Although the user interface may take a variety of forms, it will contain information substantially similar to that shown. The screen display 400 is labeled as a network configuration tool 410. A message 420 displays the purpose of the tool, which is for the programming a network interface module 102 and provides the user with instructions for proceeding if the user does not intend to program the network interface module 104. A message 430 provides further details for determining an appropriate application ID in order to proceed with programming the network interface module 104. A message 440 provides instructions to the user for selecting the application ID. User selectable items 450 may include a drop-down menu for an application ID and a selectable "continue" button.

FIG. 4B illustrates an alternative embodiment illustrating a display screen 470. In the display screen 470, the user is provided with a form including a section 472 in which a provided application ID may be entered by the user. FIG. 4C illustrates an additional screen display 480 that might appear if the user enters an invalid application ID in the section 472 of FIG. 4B. The screen display 480 informs the user that the entered application ID does not exists and again provides a section 482 for entry of an appropriate application ID.

FIG. 5A is a screen display illustrating an additional user interface in accordance with an embodiment of the invention. After selecting or filling in the application ID in the screen display 400 or 470, the user may be presented with the screen display 500. The screen display 500 will also hold a JAVA or script application that scans the LAN 100 for the network interface module 104. The screen display 500 shows the selected application ID 510. A message 520 indicates that all network modules found on the network are displayed below and instructs the user to select the proper MAC address from a list 530 of provided MAC addresses. The user interface 500 also offers selectable options including a program option 540, an advanced option 550, and a scan again option 560. After the user selects the MAC address from the list 530, the user will have the ability to program the network interface module 104. If the user selects the program option 540 to activate programming, the JAVA or other script application selected by the user may program the network interface module 104 that is specified by the user.

FIG. 5B illustrates a screen display 570 that may be shown after the user selects the programming option and successfully programs the network interface module 104. A message 572 indicates successful programming.

FIG. 6 is a screen display illustrating a user interface for advanced configuration tools in accordance with an embodiment of the invention. The advanced configuration tools may be present in some embodiments of the invention, but absent in others. A user interface 600 shows the network interface configuration tool for advanced configuration. The interface 600 may include an advanced parameters instruction section 610, a Dynamic Host Configuration Protocol (DHCP) checkbox 630, an IP address blank 640, a subnet mask blank 650, and a gateway IP address blank 660. A telnet password section 670 and a built in web manager programming section 680 may also be provided. A selectable program button 690 along with a cancellation option may also be provided. Again, the configuration of the advanced tools may vary, but the information provided may be similar to that shown in FIG. 6.

Figure 7:
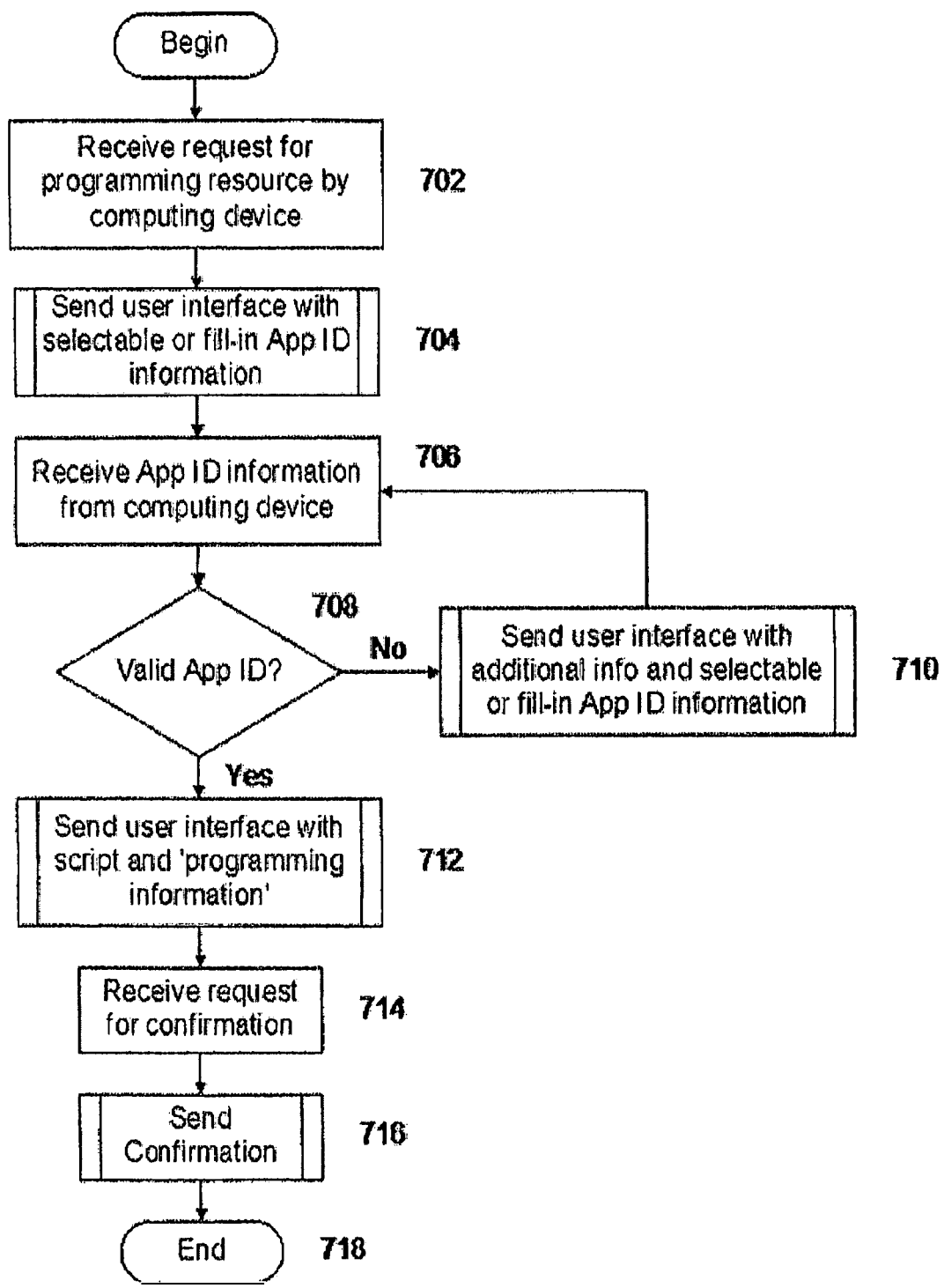
FIG. 7 is a flow chart illustrating a method for programming a network interface module from a server perspective in accordance with an embodiment of the invention.

FIG. 7 is a flow chart illustrating a method for programming a network interface module 104 from a server side in accordance with an embodiment of the invention. The process begins in step 700 and the server 200 receives a request for a programming resource in step 702. In step 704, the server 200 provides a set of selectable application IDs or fill-in form through a user interface as described above. This set may include one or more application IDs. In step 706, the server 200 receives the user selection. In step 708, the server 200 may verify that the application ID is valid specifically if the application ID is from a fill-in form. If an invalid application ID is received, the server may send a user interface as described in step 710. If a valid application ID is received, the server 200 provides a user interface, Java or other script application, and the requested application ID parameters in step 712. The Java or other script application may include the option to display one or more selectable MAC addresses. As an alternative, the Java or other script application may offer selectable advanced options in step 712. In step 714, the server 200 may receive a request for a confirmation after the program process has completed. In step 716, the server 200 may provide a user interface displaying a confirmation of programming, and in step 718, the process ends.

Figure 8:
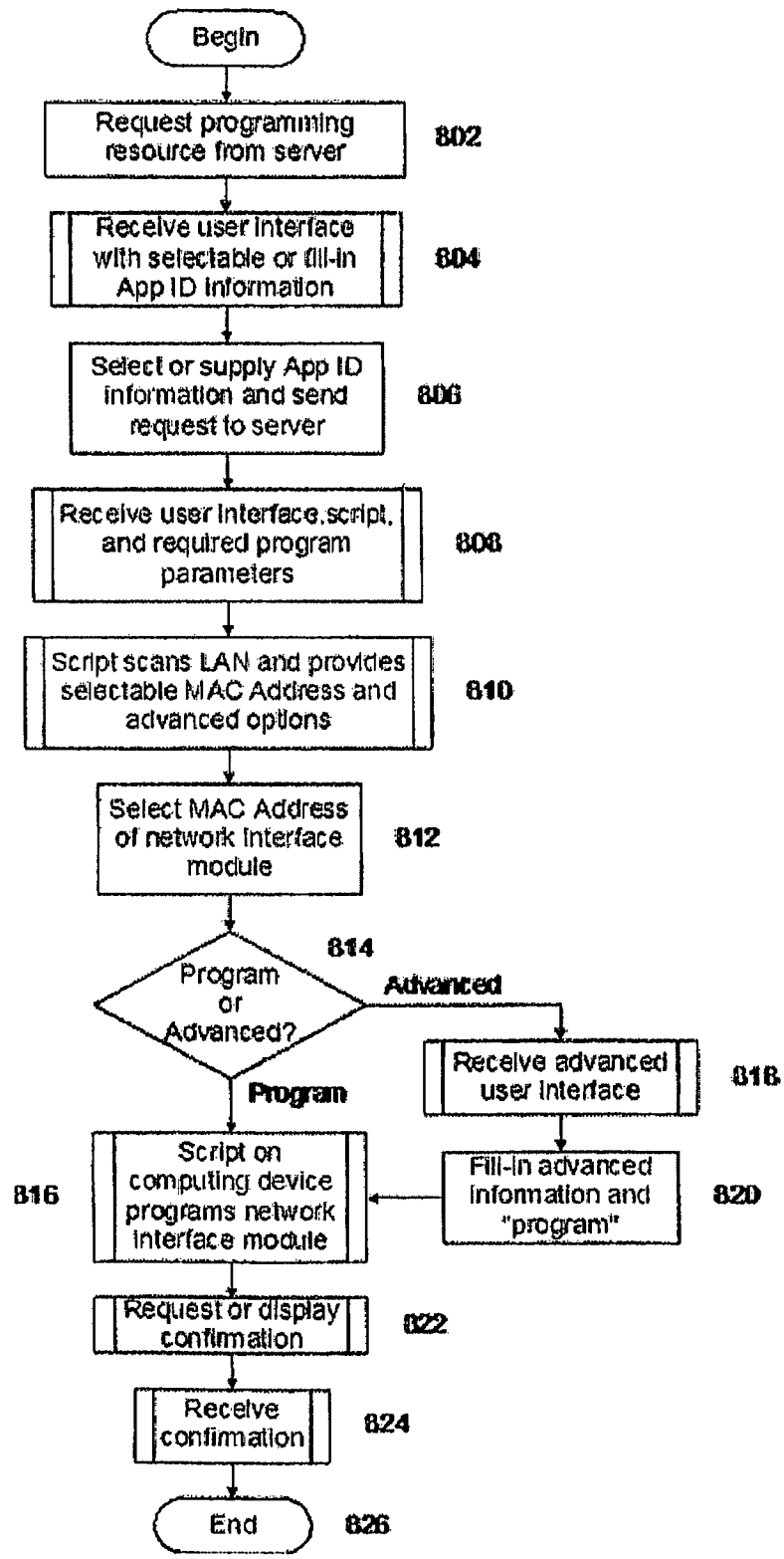
FIG. 8 is a flow chart illustrating a method for programming a network interface module from a connected computing device in accordance with an embodiment of the invention.
Figure 9:
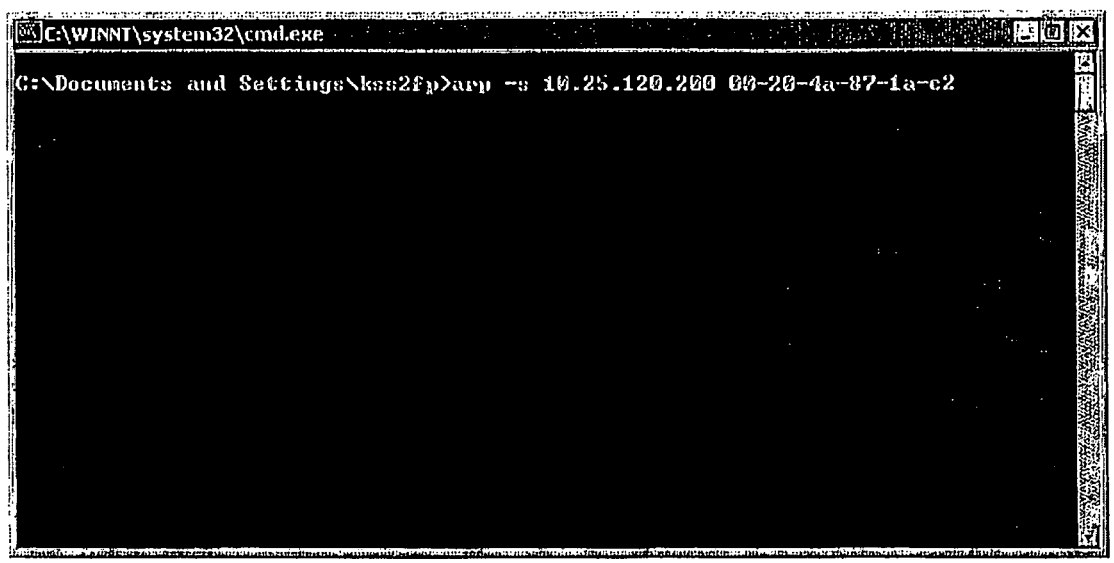
FIGS. 9-17 are screen displays illustrating related art including a method for programming a network interface module.
Figure 10:
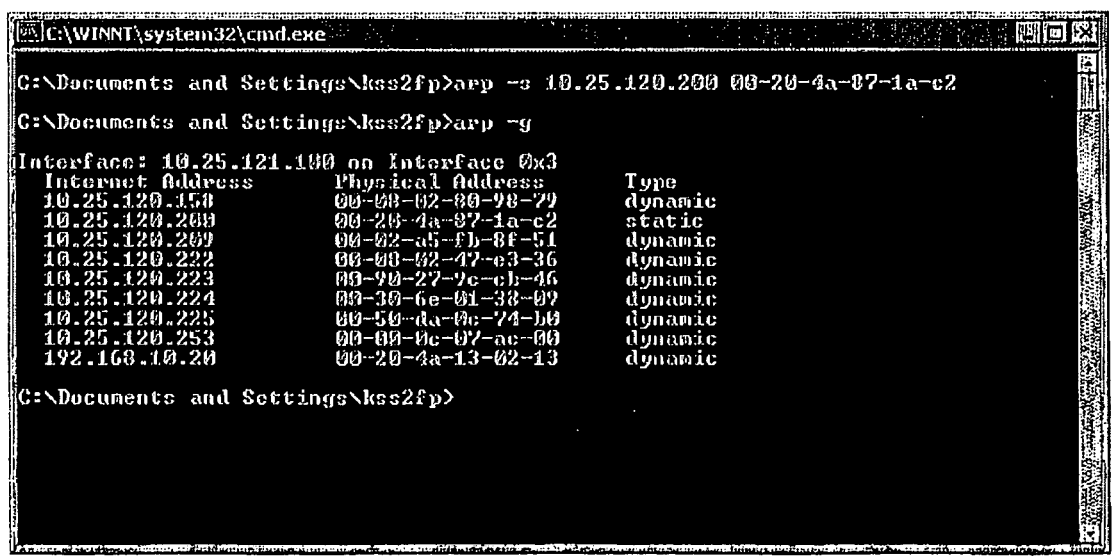
Figure 11:
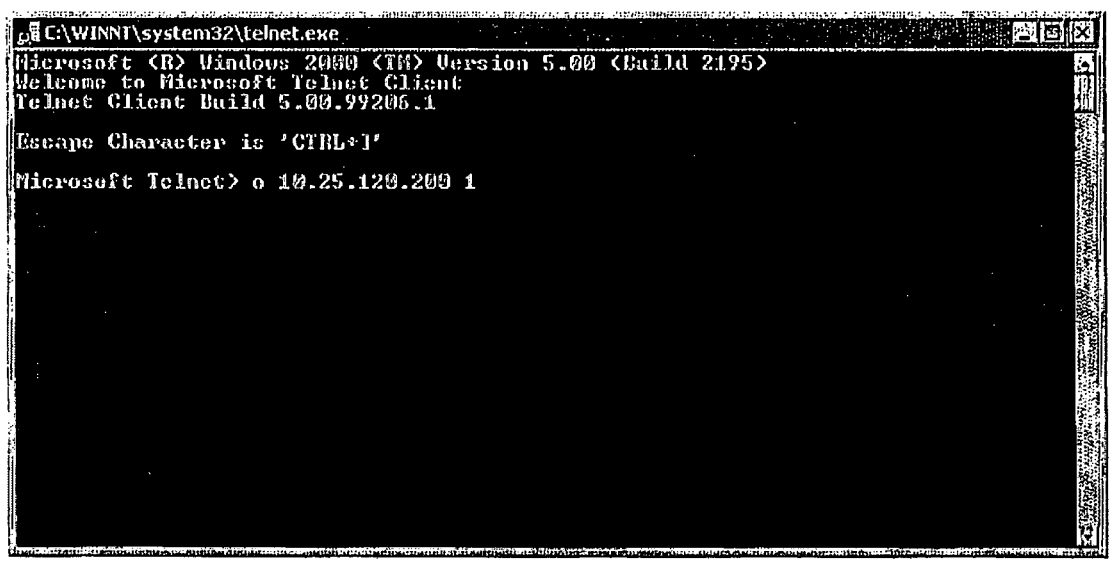
Figure 12:
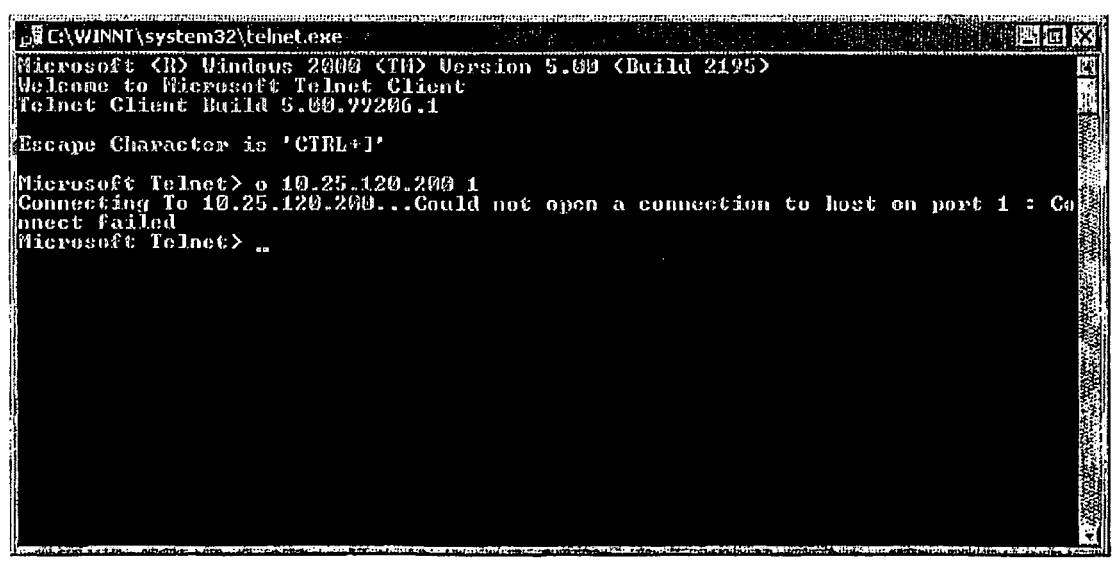
Figure 13:
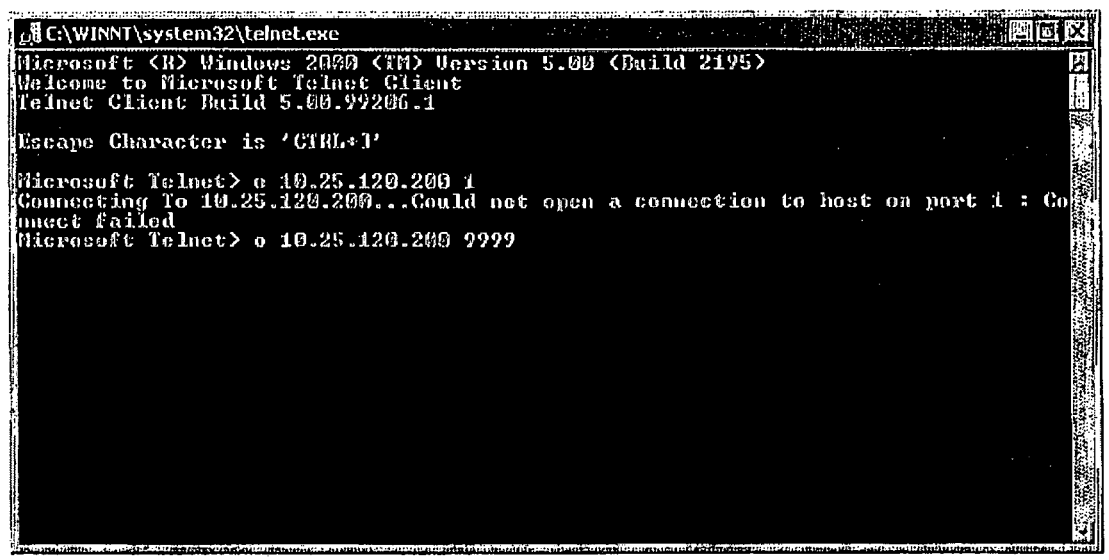
Figure 14:
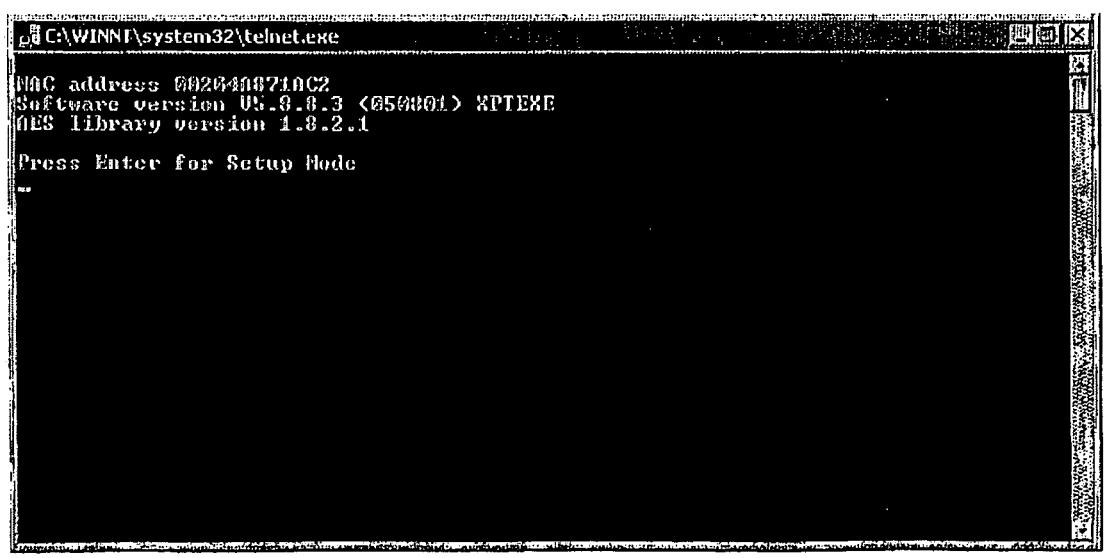
Figure 15:
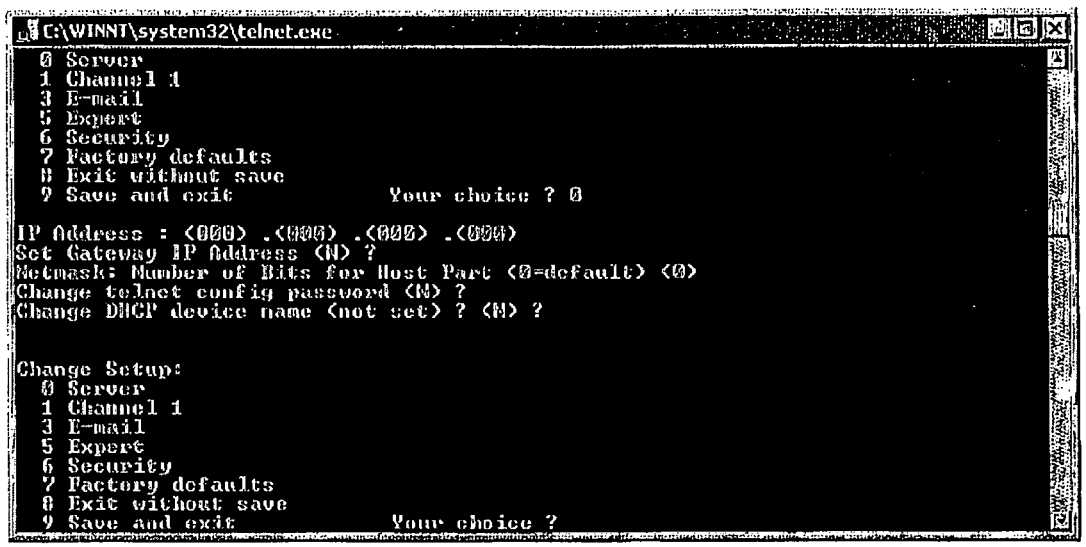
Figure 16:
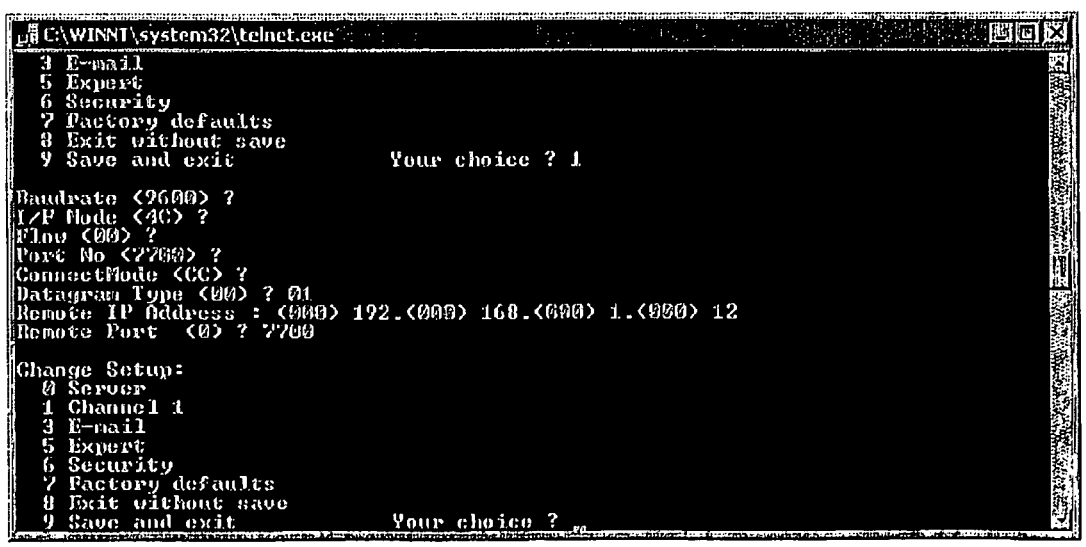
Figure 17:
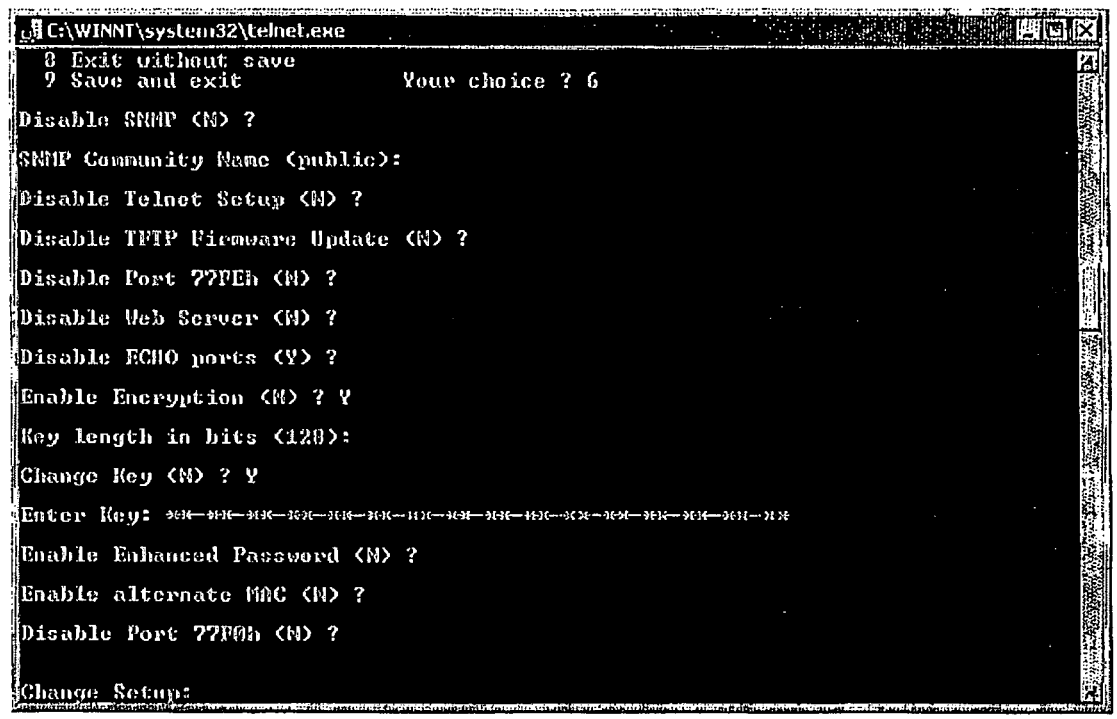

FIG. 8 is a flow chart illustrating a programming method from a user perspective. The method begins in step 800 and in step 802, the user requests the programming resource by accessing the server 200 from the computing device 102. In step 804, through the user browser 215 on the computing device 102, the user receives a user interface with a set of selectable or fill-in application IDs. The set may include one or multiple application IDs. In step 806, the user selects or fills in the desired application ID. In step 808, the user receives another user interface with a Java or other script application. In step 810, the Java or script application may search the LAN and provide a set of selectable MAC addresses. As an alternative, the user may enter the MAC Address. Again, the set may include one or more than one selectable MAC addresses. In embodiments of the invention, the user interface showing the selectable MAC addresses may also include selectable advanced options. In step 812, the user may select an appropriate MAC address and in step 814 select "program" in order to program the user interface module 104. Alternatively, the user may select advanced options in step 814 and receive the advanced user interface in step 818. In step 820, the user selects advanced options for programming. In step 816, regardless of the options the user has selected, the Java or other script application programs the user interface module 104. After the module is programmed, the Java or other script application may request in step 822. In step 824, the user receives an appropriate confirmation of programming through the user browser of the computing device 102. The method ends in step 826.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A security programming system for installing and programming a network interface module to interact with a security system from a computing device connected over a network with the network interface module, the security programming system comprising:
a server adapted to communicate with the computing device;
a network interface module scanning application located on the server and accessible through a browser of the computing device, network interface module scanning application automatically locating network interface modules on the network and providing a list of located network interface modules on the network;
user interface components located on the server and accessible through the browser of the computing device to enable selection of a newly installed network interface module participating in the security system from the list of located network interface modules automatically generated by the network interface module scanning application and to enable selection of a security system application program for the selected newly installed network interface module; and
at least one programming application located on the server for programming the selected newly installed network interface module to operate within the security system, wherein activation of the programming application is accomplished through one of a selectable and a fill-in option from the user browser of the computing device, the selected and programmed network interface module providing communication between the security system and at least one of the server and a monitoring center via the network, wherein the user interface components include an application selection component to permit a user to enter an application ID corresponding to the security system, and wherein the network interface module scanning application and the at least one programming application are automatically sent from the server to the computing device in response to the user entering a valid application ID.

2. The system of claim 1, wherein the user interface components comprise an application selection component for facilitating selection of a programming application through one of selection and fill-in of an application ID.

3. The system of claim 1, wherein the user interface components comprise a network interface module selection component for allowing one of selection and entry of a MAC address of a selected network interface module within a network.

4. The system of claim 1, wherein the user interface components comprise an advanced parameter component.

5. The system of claim 4, wherein the advanced parameter component comprises a form for user entry of information.

6. The system of claim 1, wherein the user interface components comprise at least one of fill-in forms and drop down menus including a set of user-selectable options.

7. The system of claim 1, wherein the computing device and the network interface module are connected over a LAN.

8. The system of claim 7, wherein the server is connected with the computing device over at least one of the Internet, a LAN, and a WAN.

9. The system of claim 1, wherein the at least one programming application for the selected network interface module is activated in response to the user selecting a single input button on the user interface.

10. A method for facilitating installation and programming of a network interface module for interaction with a security system from a browser of a computing device connected with the network interface module, the computing device capable of communicating over a network with a server storing components of a security programming system, the method comprising:
providing a programming resource through the server upon receiving a request from the computing device, the programming resource including a network interface module scanning application accessible through the browser of the computing device, network interface module scanning application automatically locating network interface modules on the network;
delivering a user interface including a list of located network interface modules on the network and selectable parameters, viewable through the browser, for selecting a located newly installed network interface module from the list of located network interface modules automatically generated by the network interface module scanning application;
delivering a user interface including selectable parameters, viewable through the browser for locating a programming application for the located newly installed network interface module, wherein the located, selected and programmed newly installed network interface module provides communication between the security system and at least one of the server and a monitoring center via the network; and offering an application ID list including at least one selectable application ID for selecting a programming application.

11. The method of claim 10, further comprising offering a selectable programming option through the user interface for allowing programming of the network interface module from the computing device.

12. The method of claim 10, further comprising providing a selectable advanced parameter interface.

13. The method of claim 12, further comprising providing a form for user entry of information within the selectable advanced parameter interface.

14. A non-transitory computer readable medium comprising computer executable instructions for performing the method of claim 10.

15. The method of claim 10, wherein the computing device and the network interface module are connected over a LAN.

16. A method for facilitating installation and programming of a network interface module for interaction with a security system from a browser of a computing device connected with the network interface module, the computing device capable of communicating over a network with a server storing components of a security programming system, the method comprising:

providing a programming resource through the server upon receiving a request from the computing device, the programming resource including a network interface module scanning application accessible through the browser of the computing device, network interface module scanning application automatically locating network interface modules on the network;

delivering a user interface including a list of located network interface modules on the network and selectable parameters, viewable through the browser, for selecting a located newly installed network interface module from the list of located network interface modules automatically generated by the network interface module scanning application;

delivering a user interface including selectable parameters, viewable through the browser for locating a programming application for the located newly installed network interface module, wherein the located, selected and programmed newly installed network interface module provides communication between the security system and at least one of the server and a monitoring center via the network; and offering a MAC address list including at least one selectable MAC address for locating the network interface module.

17. The method of claim 16, further comprising offering an application ID list including at least one selectable application ID for selecting a programming application.

18. A method for installing and programming a network interface module for interaction with a security system from a browser of a computing device connected with the network interface module, the computing device capable of communicating with a server storing components of a security programming system, the method comprising:

accessing a programming resource residing on the server through the browser of the computing device, the programming resource including a network interface module scanning application which automatically locates network interface modules on the network;

selecting a newly installed network interface module of the security system through user interface components including a list of located network interface modules on the network provided by the programming resource;

selecting a program provided through user interface components for programming the selected newly installed network interface module, wherein the selected and programmed network interface module provides communication between the security system and at least one of the server and a monitoring center via the network; and selecting an application ID from an application ID list including at least one selectable application ID for selecting a programming application.

19. The method of claim 18, further comprising selecting a programming option provided through the user interface components to initiate programming of the located network interface module using the programming resource.

20. The method of claim 18, further comprising entering advanced parameters into a provided advanced parameter interface.

21. The method of claim 18, wherein the computing device and the network interface module are connected over a LAN.

22. The method of claim 18, wherein the step of selecting a program provided through user interface components includes selecting a single input button on the user interface.

23. A method for installing and programming a network interface module for interaction with a security system from a browser of a computing device connected with the network interface module, the computing device capable of communicating with a server storing components of a security programming system, the method comprising:

accessing a programming resource residing on the server through the browser of the computing device, the programming resource including a network interface module scanning application which automatically locates network interface modules on the network;

selecting a newly installed network interface module of the security system through user interface components including a list of located network interface modules on the network provided by the programming resource;

selecting a program provided through user interface components for programming the selected newly installed network interface module, wherein the selected and programmed network interface module provides communication between the security system and at least one of the server and a monitoring center via the network; and selecting a MAC address from a provided list including at least one selectable MAC address for locating the network interface module.

24. The method of claim 23, further comprising selecting an application ID from an application ID list including at least one selectable application ID for selecting a programming application.

25. A method for facilitating installation and programming of a network interface module for interaction with a security system from a browser of a computing device connected with the network interface module, the computing device capable of communicating over a network with a server storing components of a security programming system, the method comprising:

providing a programming resource through the server upon receiving a request from the computing device, the programming resource including a network interface module scanning application accessible through the browser of the computing device, network interface module scanning application automatically locating network interface modules on the network;

delivering a user interface including a list of located network interface modules on the network and selectable parameters, viewable through the browser, for selecting a located newly installed network interface module from the list of located network interface modules automatically generated by the network interface module scanning application;

delivering a user interface including selectable parameters, viewable through the browser for locating a programming application for the located newly installed network interface module, wherein the located, selected and programmed newly installed network interface module provides communication between the security system and at least one of the server and a monitoring center via the network; and providing an application selection component on the user interface to permit a user to enter an application ID corresponding to the security system, and automatically sending the network interface module scanning application and the programming application from the server to the computing device in response to the user entering a valid application ID.

26. The method of claim 25, wherein the programming application for the selected network interface module is activated in response to the user selecting a single input button on the user interface.

27. A method for installing and programming a network interface module for interaction with a security system from a browser of a computing device connected with the network interface module, the computing device capable of communicating with a server storing components of a security programming system, the method comprising:

accessing a programming resource residing on the server through the browser of the computing device, the programming resource including a network interface module scanning application which automatically locates network interface modules on the network;

selecting a newly installed network interface module of the security system through user interface components including a list of located network interface modules on the network provided by the programming resource;

selecting a program provided through user interface components for programming the selected newly installed network interface module, wherein the selected and programmed network interface module provides communication between the security system and at least one of the server and a monitoring center via the network; and providing an application selection component on the user interface to permit a user to enter an application ID corresponding to the security system, and automatically sending the network interface module scanning application and the programming application from the server to the computing device in response to the user entering a valid application ID.

* * * * *